W. H. BROWN.
DECIMAL MECHANISM FOR CALCULATING MACHINES.
APPLICATION FILED OCT. 7, 1910. RENEWED JUNE 24, 1912.
1,160,372.
Patented Nov. 16, 1915.
3 SHEETS—SHEET 1.
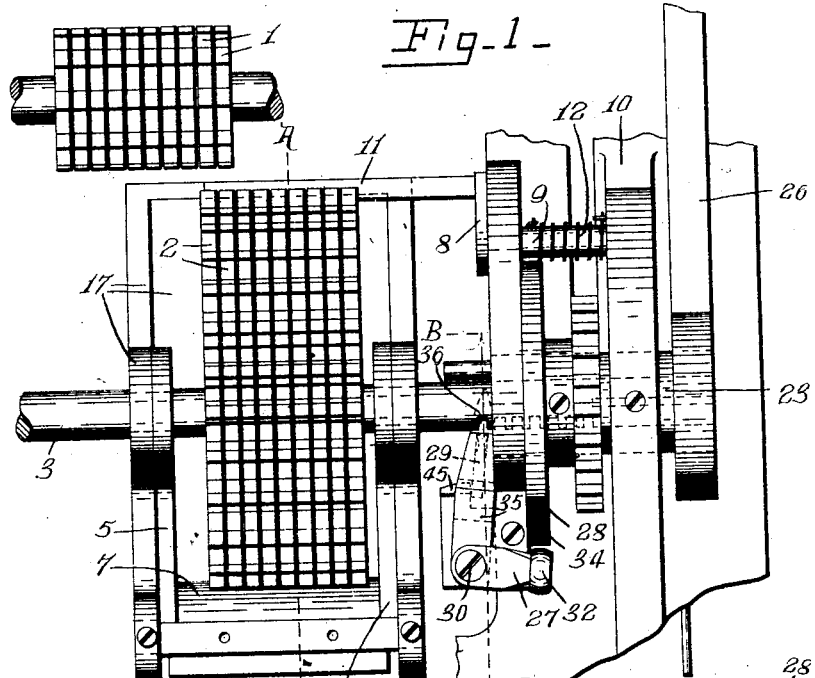
*Fig-1-*
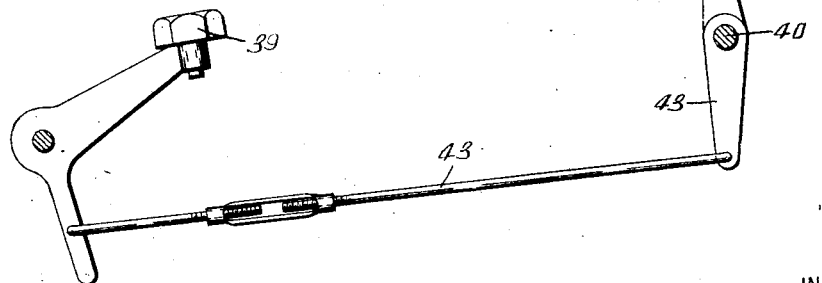
*Fig-4-*
WITNESSES:
INVENTOR
William H. Brown
BY
ATTORNEYS W. H. BROWN.
DECIMAL MECHANISM FOR CALCULATING MACHINES.
APPLICATION FILED OCT. 7, 1910. RENEWED JUNE 24, 1912.
1,160,372.
Patented Nov. 16, 1915.
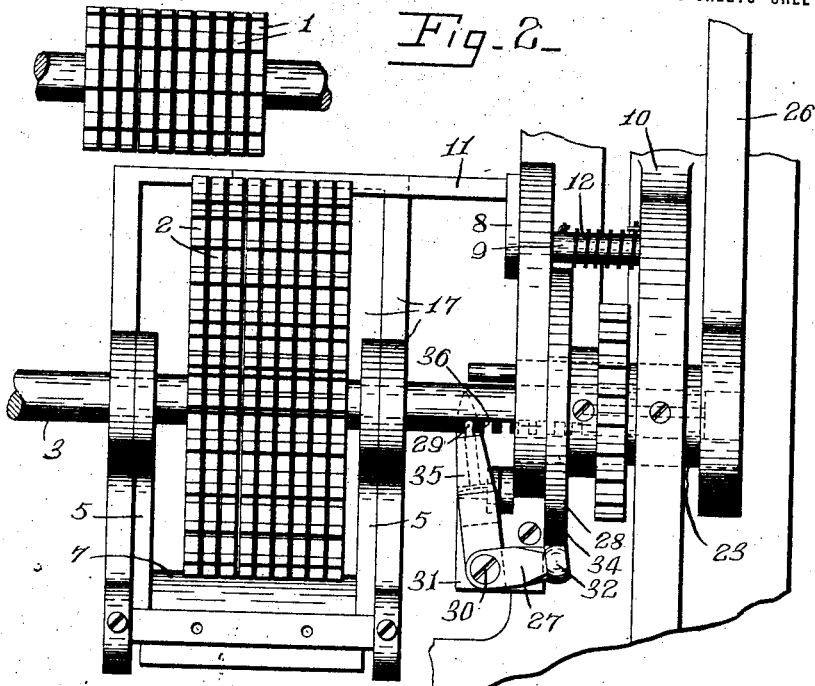
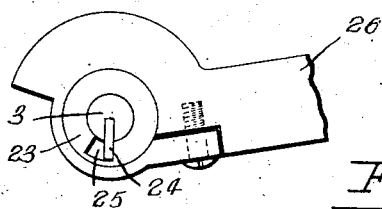
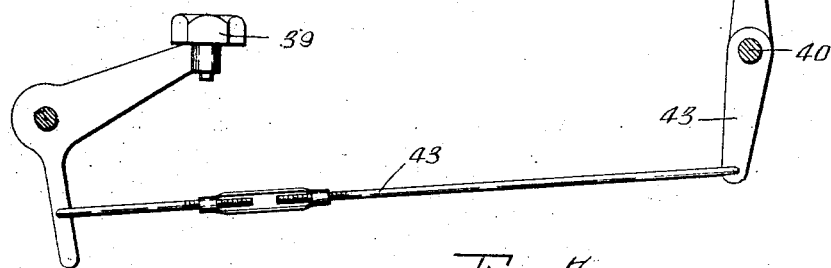
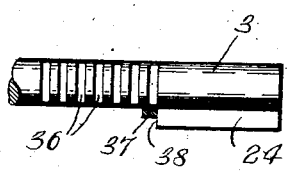

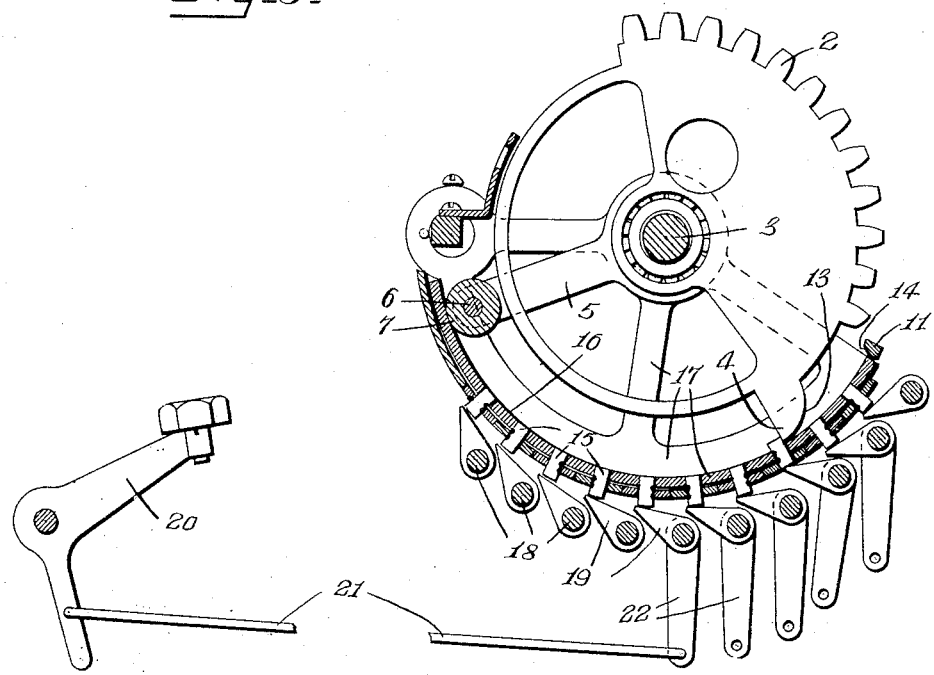

UNITED STATES PATENT OFFICE.

WILLIAM H. BROWN, OF SYRACUSE, NEW YORK, ASSIGNOR TO H. H. FRANKLIN MANUFACTURING COMPANY, OF SYRACUSE, NEW YORK, A CORPORATION OF NEW YORK.

DECIMAL MECHANISM FOR CALCULATING-MACHINES.

1,160,372.     Specification of Letters Patent.     Patented Nov. 16, 1915.

Application filed October 7, 1910, Serial No. 585,746. Renewed June 24, 1912. Serial No. 705,639.

*To all whom it may concern:*

Be it known that I, WILLIAM H. BROWN, of Syracuse, in the county of Onondaga and State of New York, have invented a certain new and useful Decimal Mechanism for Calculating-Machines, of which the following is a specification.

My invention relates to calculating machines and has for its object the production of a particularly simple and efficient decimal mechanism therefor; and it consists in the combinations and constructions hereinafter set forth and claimed.

In describing this invention reference is had to the accompanying drawing in which like characters designate corresponding parts in all the views.

Figures 1 and 2 are plan views of a portion of a calculating machine provided with my decimal mechanism, the controlling and calculating wheels being shown in different denominational relations. Fig. 3 is a sectional view on line A—A Fig. 1, other parts being added. Fig. 4 is a sectional view on the plane of line B—B Fig. 1 looking to the left, portions being omitted and portions being shown in dotted lines, the key and connections between the key and decimal mechanism being also shown. Fig. 5 is a view similar to Fig. 3, showing the key as depressed and the decimal mechanism as in operative position. Fig. 6 is an end elevation of the actuating member shown in Figs. 1 and 2. Fig. 7 is a fragmentary view of a portion of the laterally movable carriage for the controlling wheels, and contiguous parts.

1 is a series of calculating wheels, 2, a series of controlling wheels or elements mounted upon the shaft or carriage 3, which is movable axially to the left relatively to the calculating wheels for shifting the controlling wheels 2 laterally into denominational positions. Said wheels 2 are movable about the shaft into numerical positions, and with the shaft from their numerical positions, for actuating the calculating wheels 1. The calculating wheels are normally out of mesh with the controlling elements or wheels, and, after the controlling wheels have been set in their denominational and numerical positions, said calculating wheels are brought into mesh with the previously-set controlling wheels in any suitable manner.

As the means for controlling the movement of the controlling wheels 2 to the left and the means for controlling the movement of the calculating wheels into and out of mesh with the controlling wheels, form no part of my present invention, and as the movement of controlling wheels step by step into denominational positions and the relative movement of calculating wheels and controlling wheels relatively to each other, is well known to those skilled in the art, it is thought that further description is unnecessary.

The controlling wheels 2 are normally held from movement into numerical positions by means common to all of said wheels 2 and engaging radially-extending shoulders 4 provided on the wheels. When the controlling series 2 is moved laterally, the shoulders 4 are moved off the end of the holding means and the wheels 2 are free to move into their numerical positions, Fig. 3, from which they are actuated in a retrograde direction by suitable means consisting of rock arms 5 on the shaft 3 and an arm 6 connecting the ends of the rock arms and extending parallel to the shaft 3 and across the peripheries of the wheels 2 in rear of said shoulders 4, said arm 6 having a roller 7 thereon. As the shaft 3 is rotated the last-mentioned arm 6 moves through an arc and the roller 7 engages the shoulders 4 of the calculating elements 2. As here shown the holding means consists of a crank arm 8, on a shaft 9, journaled in the frame 10 and having an arm or device 11 extending parallel to the shaft and engaging said shoulders, and a spring 12 for resisting the movement of the rock arm. When the controlling series is shifted a predetermined number of steps to the right as hereinafter explained, the shoulders 4 of the two elements at the right of said series 2 will be moved under the holding device 11 so that during the retrograde movement of the elements by the shaft 3, said two elements, to the right will engage the holding device 11 and rock the crank 8 against the spring 12 carrying the device 11 out of the path of the shoulders 4 of said elements. For facilitating the movement of the holding means by the shoulders 4, the elements 2 are formed with cam faces 13 which engage an under bevel face 14 on the device 11.

The controlling wheels are limited in their numerical positions in any suitable manner as by a series of stops 15 for each wheel 2, the stops of each series representing values from 0 to 9 inclusive. As seen in Fig. 3, said stops are normally arranged flush with the concave face 16 of the support 17 carried by and movable laterally with the shaft 3, and are movable above said face 16 into the path of the shoulder 4 of the corresponding wheel 2. These stops are moved into the path of the shoulders 4 by rock shafts 18 corresponding in number to the number of stops 15 in each series, each rock shaft 18 having a rock arm 19 for coacting with a certain stop of each series. Each rock shaft 18 is operated by a key as 20 connected thereto by a link 21, which is pivoted to an arm 22 on each rock shaft. The stops 15 are depressed out of the path of the shoulders 4 into their normal positions by the roller 7 on the arm 6 when said roller is being operated to actuate the previously-set controlling wheels 2 in a retrograde direction to their starting position.

The shaft 3 is rotated by an actuating member movable about an axis coincident with said shaft, and comprises a sleeve 23 mounted on the shaft 3 and connected to the shaft 3 by a feather 24, Fig. 6, provided on said shaft and extending into a comparatively wide way 25 in the sleeve 23 for forming a lost motion connection between the sleeve 23 and the shaft 3. An operating handle 26 is mounted on the sleeve 23.

The decimal mechanism consists of means for moving the carriage 3 laterally in a retrograde direction (that is in a direction opposite to the movement of the carriage when shifting the elements 2 into the denominational positions) a predetermined number of steps usually, two steps. Preferably the controlling series is normally arranged to the right of the calculating series, having its two elements to the extreme left arranged opposite to the two elements at the extreme right of the calculating series, Fig. 1. Thus the two wheels at the extreme right of the calculating wheels 1 are always decimal or "cents" wheels.

As here shown the decimal mechanism comprises power transmitting connections between the actuating member 23 and the carriage on shaft 3 whereby the carriage is shifted to the right a predetermined distance after the elements 2 have been shifted into denominational positions and preliminary to the actuation of said elements from their numerical positions, such shifting to the right moving some of the elements in denominational positions, out of such positions, and into decimal positions. As seen in Figs. 1, 2, 4 and 5, the connections preferably include a part as a lever 27 coacting with a cam 28 on the actuating member 23, and a member 29 associated with the lever 27 and shiftable at will into connection with the carriage 3.

The lever 27 is usually a bell crank pivoted at 30 to the portion 31 of the main frame of the machine, and is formed with a roller 32 at the end of one of its arms, which roller 32 coöperates with a surface 33 on the part or cam 28 carried by the main actuating member 23. The part 28 is also provided with a surface 34 concentric with the axis of said part 28, and, so far as this invention is concerned said surface 34 serves as a guide upon which said roller 32 rides after moving out of engagement with the cam surface 33. The other arm 35 of said lever carries a clutch member 29 movable in a guide therein beyond the end of said arm 35 into any one of a series of sockets or notches 36, Fig. 7, formed in the shaft 3, and corresponding in number to the number less two of the controlling elements 2. Said arm 35 is also formed with an extension 37, Figs. 4 and 5, projecting across the shaft 3 and into the path of a shoulder 38, Fig. 7, on the shaft 3. As here shown the shoulder 38 is the end of the feather 24 which connects the shaft 3 and the hollow shaft or sleeve 23.

The lost motion before referred to, permits the cam 28 to move the lever 27 on its pivot before the actuating member 23 starts the rotation of the shaft 3 to actuate the controlling elements. When the sliding clutch member 29 is in one of the sockets or notches 36, and the hollow shaft 23 is operated, the shaft 3 will be moved axially to the right by the cam surface 33, and the bell-crank lever 27, and, after this axial movement is completed, the lost motion between the sleeve 23 and shaft 3 is then taken up, so that the shaft 3 is rotated, causing the periphery of the shaft 3 to engage and push the sliding clutch member 29 out of the socket or notch 36.

The clutch member 29 is operated by means of a key 39 and connections between the key 39 and said clutch member 29, said connections being here shown as a rock shaft 40 supported by the frame piece 31 and having oppositely-extending rock arms 41 and 42, one of which is connected to the key lever 39 by a link 43, and the other of which enters a recess 44 in the arm 35 of the bell crank lever and engages the end of the sliding clutch member 29, Figs. 4 and 5. Obviously as the key lever 39 is depressed the link 43 will be pulled to the left, Figs. 3 and 4, thereby throwing the clutch member to the right and into one of the sockets 36.

The movement of the arm 35 of the bell crank lever in the same direction as the movement of the controlling wheels into denominational positions, is prevented by a stop 45 fixed to the frame piece 31 and arranged in alinement with the recess 44 of the arm 35 and in the path of the tail 46 of the clutch member 29, so that when the extension 37 of the arm 35 is engaged by the shoulder 38, further movement of the shaft 3 is prevented, notifying the operator that the shaft 3 can shift two more steps to the left and that these two steps are reserved for decimals or "cents". By operating the decimal key 39, the clutch member 29 is thrown into one of the sockets 36, so that its opposite end or tail 46 is out of the path of the stop 45, in order that the wheels 2 may be moved two more steps to the left for carrying the two wheels in which the decimal figures are set, off the end of the device 11. Upon the operation of the main shaft 23 by the lever 26 the carriage 3 will be carried two steps to the right.

In operation the decimal key 39 may be operated to throw the clutch member 29 into one of the notches 36 at any point in the lateral shifting of the shaft 3. This shifting is fully explained in my pending application referred to. If the decimal key is depressed before any of the numeral keys 20 have been operated and consequently before any lateral shifting of the shaft 3 has taken place, the clutch member 29 will enter the first notch 36 to the left, and the number set up in the wheel 2 will contain two figures and will be a decimal, as the shaft 3 can shift but two steps to the left before the roller 32 on one arm of the bell-crank lever 27 engages the cam face 33 and limits further pivotal movement of the bell crank lever 27 and consequently further shifting to the left of the shaft 3. Upon the operation of the shaft 23 by the hand lever 26, the cam surface 33 actuates the bell crank lever 27 sufficiently to carry the shaft 3 two steps to the right before the lost motion between the shafts 23 and 3 is taken up. If the decimal key 39 is depressed after the shaft 3 has shifted one step to the left by the depression of a numeral key as 20, the clutch member 29 will enter the second notch 36 from the left and the number set up in the wheels 3 will contain one whole number and a decimal. Thus the notch 36 that the clutch member 29 enters, depends on the number of whole numbers in the example set up in the wheels 2.

What I claim is:—

1. In a calculating machine, a main actuator, calculating mechanism including a series of shiftable elements, means for setting an example in the mechanism, and decimal setting mechanism including means for coupling said series of elements and the actuator whereby said series of elements is shifted to set the decimal upon the operation of the main actuator, and prior to the calculating operation of said elements effected by the actuator, substantially as and for the purpose described.

2. In a calculating machine, a main actuator, decimal setting mechanism operable after the example has been set and preliminary to the calculating operation, and means for connecting said mechanism and the actuator, substantially as and for the purpose specified.

3. In a calculating machine, a main actuator, decimal setting mechanism operable after the example has been set and preliminary to the calculating operation, said mechanism being normally disconnected from the main actuator, and means including a key for connecting said mechanism and the actuator, substantially as and for the purpose set forth.

4. In a calculating machine, a series of elements shiftable as one body, and decimal setting mechanism operating to shift the elements as one body after the example has been set and preliminary to the calculating operation, substantially as and for the purpose described.

5. In a calculating machine, a series of elements shiftable as one body, and decimal setting mechanism operating to shift the elements as one body after the example has been set and preliminary to the calculating operation, said mechanism comprising a key for moving the decimal mechanism into and out of operative relation, substantially as and for the purpose specified.

6. In a calculating machine, a series of elements, shiftable as one body and being also movable independently of each other in a direction crosswise of their shifting movement, means for actuating the elements in a direction crosswise of their shifting movement, and decimal mechanism operated by said means for moving said series of elements as one body preliminary to the movement of said elements in a direction crosswise of the axis of the shifting movement, substantially as and for the purpose set forth.

7. In a calculating machine, a series of elements, shiftable as one body and being also movable independently of each other in a direction crosswise of their shifting movement, means for actuating the elements in a direction crosswise of their shifting movement, and decimal mechanism operated by said means for moving said series of elements as one body preliminary to the movement of said elements in a direction crosswise of the axis of the shifting movement, said means comprising a key operable to connect and disconnect the decimal mechanism and said actuating means, substantially as and for the purpose described.

8. In a calculating machine, a carriage, a plurality of series of digital stops supported by the carriage, digital keys for operating the stops and controlling the shifting of the carriage in one direction, decimal mechanism operating to shift the carriage a predetermined number of steps in the opposite direction prior to the calculating operation, an actuator operable to effect the calculating operation and connections between the actuator and the decimal mechanism, substantially as and for the purpose specified.

9. In a calculating machine, a carriage shiftable step by step in one direction, keys for controlling the shifting of the carriage, means for effecting the calculating operation and moving the carriage in the opposite direction, decimal mechanism operable to shift the carriage in the last mentioned direction prior to the calculating operation, an actuator operable to effect the calculating operation and connections between the actuator and the decimal mechanism, substantially as and for the purpose set forth.

10. In a calculating machine, a carriage shiftable step by step in one direction, keys for controlling the shifting of the carriage, means for effecting the calculating operation and moving the carriage in the opposite direction, and decimal mechanism operable to shift the carriage in the last mentioned direction prior to the calculating operation, the decimal mechanism being operable to limit the shifting of the carriage to a predetermined number of steps in the first mentioned direction after the decimal mechanism has been operated, substantially as and for the purpose described.

11. A calculating machine, a main actuator, calculating mechanism including a carriage shiftable step by step in one direction, keys for controlling the setting of an example in the calculating mechanism and the step by step movement thereof, and decimal mechanism operable to shift the carriage a predetermined number of steps in the opposite direction preliminary to the calculating operation, said mechanism including means for connecting the same to the main actuator, substantially as and for the purpose specified.

12. In a calculating machine, a carriage shiftable step by step in one direction, keys for controlling the feeding of the carriage, means for effecting the calculating operation and moving the carriage in the opposite direction, and decimal mechanism operable to shift the carriage in the last mentioned direction prior to the calculating operation, the decimal mechanism being operable to limit the carriage to a predetermined number of steps in the first mentioned direction after the decimal mechanism has been operated, the decimal mechanism including operating means and means for limiting the step by step movement of the carriage to a predetermined number of steps after the operating means has been actuated, substantially as and for the purpose set forth.

13. In a calculating machine, a carriage shiftable step by step in one direction, keys for controlling the shifting of the carriage, means for effecting the calculating operation and moving the carriage in the opposite direction, and decimal mechanism operable to shift the carriage in the last mentioned direction prior to the calculating operation, the decimal mechanism being operable to limit the carriage to a predetermined number of steps in the first mentioned direction after the decimal mechanism has been actuated, the decimal mechanism including a lever, a clutch carried by the lever movable into and out of connection with the carriage, a key for operating the clutch, and means for forcing the clutch out of operative position after each calculating operation, substantially as and for the purpose described.

14. In a calculating machine, a carriage shiftable step by step in one direction, keys for controlling the shifting of the carriage, means for effecting the calculating operation and moving the carriage in the opposite direction, and decimal mechanism operable to shift the carriage in the last mentioned direction prior to the calculating operation, the decimal mechanism being operable to limit the carriage to a predetermined number of steps in the first mentioned direction after the decimal mechanism has been actuated, the decimal mechanism including a lever, a clutch carried by the lever movable into and out of connection with the carriage, a key for operating the clutch, means for forcing the clutch out of operative position after each calculating operation, a cam connected to the first means for actuating the lever, and a shoulder on the carriage for engaging the lever and moving the same to engage the lever with the cam, substantially as and for the purpose specified.

15. In a calculating machine, a series of elements shiftable as one body and movable in a direction crosswise of the shifting movement, means for actuating the elements in a direction crosswise of the shifting movement, and means operated by the actuating means for shifting the series of elements as one body preliminary to the actuation of said elements, substantially as and for the purpose described.

16. In a calculating machine, a series of elements shiftable as one body and movable in a direction crosswise of the shifting movement, means for actuating the elements in a direction crosswise of the shifting movement, means operated by the actuating means for shifting the series of elements as one body preliminary to the actuation of said elements, the shifting means being normally out of connection with the series of elements, and means for moving the shifting means into connection with said series, substantially as and for the purpose specified.

17. In a calculating machine, a shiftable carriage, a series of elements carried by and movable with the carriage, and means for shifting the carriage including an actuating member, connections between the actuating member and the carriage, said connections being normally disconnected from the carriage, and manually operable means for connecting the same to the carriage, substantially as and for the purpose set forth.

18. In a calculating machine, a shiftable carriage, a series of elements carried by and movable with the carriage, and means for shifting the carriage including an actuating member, connections between the actuating member and the carriage, the connections including a pivoted lever, the lever being normally disconnected from the carriage, and manually operable means for connecting the lever to the carriage, substantially as and for the purpose described.

19. In a calculating machine, a shiftable carriage, a series of elements carried by and movable with the carriage, and means for shifting the carriage including an actuating member, and connections between the actuating member and the carriage, the connections including a power-transmitting part, and a member associated with said part and movable into and out of connection with the carriage, substantially as and for the purpose specified.

20. In a calculating machine, a shiftable carriage, a series of elements carried by and movable with the carriage, and means for shifting the carriage including an actuating member movable about an axis and having a cam, and connections between the actuating member and the carriage, the connections including a power-transmitting part coacting with the cam, and a member associated with said part and movable into and out of connection with the carriage, substantially as and for the purpose set forth.

21. In a calculating machine, a shiftable carriage, a series of elements carried by and movable with the carriage, and means for shifting the carriage including an actuating member, connections between the actuating member and the carriage, the connections including a lever pivoted intermediate of its ends, one arm of the lever being normally disconnected from the carriage and the other arm thereof coacting with the shifting means, and manually operable means for connecting the first-mentioned arm of the lever to the carriage, substantially as and for the purpose described.

22. In a calculating machine, a shiftable carriage having a part formed with a socket, a series of elements carried by and movable with the carriage, and means for shifting the carriage laterally including an actuating member, and connections between the actuating member and the carriage, the connections including a power-transmitting part, and a member associated with the power-transmitting part and movable into and out of the socket, substantially as and for the purpose specified.

23. In a calculating machine, a shiftable carriage having a part formed with a socket, a series of elements carried by and movable with the carriage, and means for shifting the carriage including an actuating member movable about an axis and having a cam, and connections between the actuating member and the carriage, the connections including a lever pivoted intermediate of its ends, one arm thereof coacting with the cam, and a clutch member associated with the other arm of the lever and movable into and out of the socket, substantially as and for the purpose set forth.

24. In a calculating machine, a shiftable carriage, a series of elements carried by and movable with the carriage and also relatively to the carriage, means for actuating said elements relatively to the carriage comprising a member movable about an axis, and connections between said member and the carriage whereby the carriage is shifted preliminary to the actuation of said elements, substantially as and for the purpose described.

25. In a calculating machine, a shiftable carriage comprising a shaft movable about an axis, a series of elements carried by and movable with the carriage, said elements being movable about the axis of the shaft, connections between the shaft and said elements whereby said elements are actuated by the shaft, means for actuating the shaft comprising a member movable about an axis coincident with the axis of the shaft, and connections between said member and the carriage whereby the carriage is shifted preliminary to the actuation of said elements by the shaft, substantially as and for the purpose specified.

26. In a calculating machine, a shiftable carriage comprising a shaft movable about an axis, a series of elements mounted on the shaft and movable with the carriage, said elements being movable about the axis of the shaft, connections between the shaft and said elements whereby said elements are actuated by the shaft, means for actuating the shaft comprising a sleeve arranged on said shaft and connected thereto, and connections between the sleeve and the carriage whereby the carriage is shifted preliminary to the actuation of said elements by the shaft, substantially as and for the purpose set forth.

27. In a calculating machine, a shiftable carriage having a part formed with a socket, a series of elements carried by and movable with the carriage, said elements being also movable in a direction crosswise of the carriage, means for actuating said elements in a direction crosswise of the carriage, and connections between the actuating means and the carriage whereby the carriage is shifted preliminary to the actuation of said means, said connections including a power-transmitting part and a shiftable clutch member associated with said part and movable into the socket of the carriage, and shifting means connected to the clutch member, substantially as and for the purpose described.

28. In a calculating machine, a shiftable carriage, a series of elements carried by and movable with the carriage, and also relatively to the carriage, means for actuating said elements relatively to the carriage, and connections between said means and the carriage whereby the carriage is shifted preliminary to the actuation of said elements, said connections including a lever, and a member associated with the lever and movable into and out of connection with the carriage, substantially as and for the purpose specified.

29. In a calculating machine, a shiftable carriage comprising a shaft movable about an axis, a series of elements carried by and movable with the carriage, said elements being movable about the axis of the shaft, connections between the shaft and said elements whereby said elements are actuated by the shaft, means for actuating the shaft comprising a member movable about an axis, and connections between said member and carriage whereby the carriage is shifted preliminary to the actuation of said elements by the shaft, said connections including a pivoted lever, and means for connecting the lever to the carriage, substantially as and for the purpose set forth.

30. In a calculating machine, a shiftable carriage comprising a shaft movable about an axis, a series of elements carried by and movable with the carriage, said elements being movable about the axis of the shaft, connections between the shaft and said elements whereby said elements are actuated by the shaft, means for actuating the shaft comprising a member movable about an axis and having a cam, and connections between said member and the carriage whereby the carriage is shifted preliminary to the actuation of said elements by the shaft, said connections including a lever coacting with the cam, and means for connecting the lever to the carriage, substantially as and for the purpose described.

31. In a calculating machine, a shiftable carriage comprising a shaft movable about an axis, a series of elements carried by and movable with the carriage, said elements being movable about the axis of the shaft, connections between the shaft and said elements whereby said elements are actuated by the shaft, means for actuating the shaft comprising a member movable about an axis coincident with the axis of the shaft and having a cam, connections between said member and the carriage whereby the carriage is shifted laterally preliminary to the actuation of said elements by the shaft, the connections including a lever pivoted intermediate of its ends and one arm thereof coacting with the cam, and means for connecting the other arm to the carriage, substantially as and for the purpose specified.

32. In a calculating machine, a laterally movable carriage comprising a shaft, a series of elements mounted on the shaft and movable laterally with the carriage, said elements being movable about the shaft, connections between the shaft and said elements whereby the elements are actuated by the shaft, means for actuating the shaft comprising a sleeve arranged on said shaft and connected thereto, the sleeve having a cam, and connections between the sleeve and the carriage whereby the carriage is shifted preliminary to the actuation of said elements by the shaft, said connections including a lever pivoted intermediate of its ends and having one arm thereof coacting with the cam, and means for connecting the other arm to the carriage, substantially as and for the purpose set forth.

33. In a calculating machine, a shiftable carriage, a series of elements carried by and movable with the carriage, said elements being movable independently of each other into numerical positions, means for actuating said elements from their numerical positions, and means for shifting the carriage laterally preliminary to the actuation of said elements from their numerical positions, substantially as and for the purpose described.

34. In a calculating machine, a shiftable carriage, a series of elements carried by and movable with the carriage and being advanced thereby into denominational positions, said elements being movable in a direction crosswise of the carriage when in said positions, means for actuating said elements crosswise of the carriage, and decimal mechanism comprising means for moving the carriage a predetermined distance in a retrograde direction preliminary to the actuation of said elements, substantially as and for the purpose specified.

35. In a calculating machine, a shiftable carriage comprising a part formed with a series of sockets, a series of elements carried by and movable with the carriage into denominational positions, said elements being also movable in a direction crosswise of the carriage when in denominational positions, means for actuating the elements in denominational positions comprising an actuating member, and decimal mechanism comprising a power-transmitting part and a clutch member movable into and out of one of the sockets, and means for moving the clutch member into one of the sockets, substantially as and for the purpose set forth.

36. In a calculating machine, a carriage comprising an axially shiftable shaft movable about an axis, a series of transverse elements mounted on the shaft and movable axially therewith into denominational positions, said elements being also movable about the axis of the shaft, connections between the shaft and said elements whereby said elements are actuated by the shaft, means for actuating the shaft comprising a member movable about an axis and connected to the shaft, said member being formed with a cam, and decimal mechanism comprising a lever coacting with the cam and a clutch member associated with the lever for entering one of the sockets of said shaft, means for throwing the clutch member into one of said notches at any point during the shifting of the carriage when moving the elements into denominational positions, the lever operating to shift the carriage in a retrograde direction a predetermined distance in order to move some of the elements out of denominational positions preliminary to the actuation of the shaft and the elements, substantially as and for the purpose described.

37. In a calculating machine, a series of elements shiftable as one body, said elements being movable independently of each other in a direction crosswise of the shifting movement, means for normally holding said elements from movement, the shifting of said elements as one body releasing the same from the holding means and permitting movement thereof in one direction, means for limiting the movement of said elements in one direction, means for actuating the released elements in the reverse direction, and means operated by the actuating means for shifting the series of elements laterally preliminary to the actuation thereof in the reverse direction, substantially as and for the purpose specified.

38. In a calculating machine, a shiftable carriage, a series of elements carried by and movable with the carriage into denominational positions, said elements being movable in one direction crosswise of the carriage into numerical positions, means for normally holding said elements from movement into numerical positions, the shifting of the carriage in one direction effecting the releasing of said elements from the holding means, means for actuating the released elements from their numerical positions, and means for moving the carriage a predetermined distance in a retrograde direction preliminary to the actuation of the released elements from their numerical positions, substantially as and for the purpose set forth.

39. In a calculating machine, a shiftable carriage comprising a rotatable shaft formed with a series of sockets, a series of elements carried by and movable with the carriage into denominational positions, said elements being movable in one direction about the shaft into numerical positions, means for normally holding said elements from movement, the shifting of the carriage for moving the elements into denominational positions, also serving to release said elements from the holding means, means for rocking the shaft, connections between the shaft and said released elements whereby the released elements are actuated in the reverse direction during the rocking of the shaft, the last-mentioned means comprising a member movable about an axis and formed with a cam, said member being connected to the shaft, a pivoted lever coacting with the cam and a clutch member associated with said lever for entering one of said sockets and means for moving the clutch member into the socket, said clutch member being forced out of the notch by the periphery of the shaft during the rotation thereof, substantially as and for the purpose described.

40. In a calculating machine, a shiftable carriage comprising a rotatable shaft formed with a series of sockets, a series of elements carried by and movable with the carriage into denominational positions, said elements being movable in one direction about the shaft into numerical positions, means for normally holding said elements in their normal position, the shifting of the carriage for moving the elements into denominational positions, also serving to release said elements from the holding means, means for rocking the shaft, connections between the shaft and said released elements whereby the released elements are actuated in the reverse direction during the rocking of the shaft, an actuating member movable about an axis coincident with the axis of the shaft and connected thereto, said member being formed with the peripheral cam, a bell crank lever having one of its arms coacting with the cam, a clutch member associated with the other arm thereof and means for throwing the clutch into one of said sockets, substantially as and for the purpose specified.

41. In a calculating machine, a shiftable carriage comprising a rotatable shaft, a series of elements mounted on the shaft and movable with the carriage into denominational positions, said elements being movable about the shaft in one direction into numerical positions, and each of said elements being formed with a shoulder, means for engaging the shoulders of said elements and holding said elements from movement into numerical positions, the lateral shifting of the carriage for moving the elements into denominational positions serving to release the shoulders of said elements from the holding means, a rock arm mounted on the shaft and having a portion extending across said elements in rear of said shoulders and being normally spaced apart from said shoulders, an actuating member connected to the shaft, a power-transmitting part connected to the actuating member, a clutch member for connecting said part to the carriage, and means for operating the clutch member, substantially as and for the purpose set forth.

42. In a calculating machine, a frame, a shiftable carriage supported by the frame, the carriage comprising a rotatable shaft, a series of elements mounted on the shaft and movable with the carriage into denominational positions, said elements being movable about the shaft in one direction into numerical positions and each of said elements being formed with a radially-extending shoulder, a device for engaging the shoulders of all of said elements and holding said elements from movement into numerical positions, the lateral shifting of the carriage in one direction moving the shoulders of said elements off the end of the holding device, a rock arm mounted on the shaft and having a portion extending across said elements in rear of said shoulders and being normally spaced apart from said shoulders, a sleeve mounted on the shaft and having a peripheral cam, a bell crank lever pivoted to the frame and one arm thereof coacting with said cam, a clutch member provided at the end of the other arm, the clutch member being normally arranged opposite to the sockets and means connected to the clutch member for throwing the clutch member into one of said sockets at any point during the shifting of the carriage in one direction, substantially as and for the purpose described.

43. In a calculating machine, a shiftable carriage, a series of elements carried by and movable with the carriage into denominational positions, said elements being movable in a direction crosswise of the carriage, means for actuating said elements when in denominational positions, and decimal mechanism for moving the carriage a predetermined distance in a retrograde direction preliminary to the actuation of said elements, and means associated with the decimal mechanism for limiting the movement of the carriage laterally into denominational positions when the carriage has traveled a predetermined distance, substantially as and for the purpose specified.

44. In a calculating machine, a frame, a shiftable carriage supported by the frame and having a shoulder, a series of elements carried by and movable with the carriage into denominational positions, said elements being movable in a direction crosswise of the carriage when in denominational positions, means for actuating said elements, and a movable part coacting with the actuating means, and extending into the path of said shoulder, substantially as and for the purpose set forth.

45. In a calculating machine, a frame, a shiftable carriage supported by the frame and having a shoulder, a series of elements carried by and movable with the carriage into denominational positions, means for actuating said elements comprising a member movable about an axis and having a cam associated therewith, and a lever pivoted to the frame and coacting with the cam and extending into the path of said shoulder, substantially as and for the purpose described.

46. In a calculating machine, a frame, a shiftable carriage supported by the frame and comprising a part having a socket and a shoulder, a series of elements carried by the carriage and movable in a direction crosswise thereof, when in denominational positions, means for actuating said elements comprising a member movable about an axis and having a cam associated therewith, a power-transmitting part coacting with the cam and extending into the path of the shoulder of the carriage, a clutch member carried by said power-transmitting part and movable into and out of the socket of the carriage and operating means connected to the clutch member, substantially as and for the purpose specified.

47. In a calculating machine, a frame, a shiftable carriage supported by the frame and comprising a part having a socket and a shoulder, a series of elements carried by and movable with the carriage into denominational positions, said elements being movable in a direction crosswise of the carriage when in denominational positions, means for actuating said elements comprising a member movable about an axis and having a cam associated therewith, a power-transmitting part coacting with the cam and extending into the path of the shoulder of the carriage, a clutch member carried by the power-transmitting part and movable into the socket of the carriage, a stop fixed relatively to the frame for limiting the movement of the power-transmitting part, and means for operating the clutch member and disengaging said power-transmitting part from the fixed stop, substantially as and for the purpose set forth.

48. In a calculating machine, a frame, a shiftable carriage supported by the frame and comprising a part formed with a shoulder, a series of elements carried by and movable with the carriage into denominational positions, said elements being movable in a direction crosswise of the carriage when in denominational position, means for actuating said elements comprising a member movable about an axis and having a cam, a power-transmitting part coacting with the cam and extending into the path of the shoulder, a clutch member carried by the power-transmitting part and movable into the socket of the carriage, a stop for limiting the movement of the power-transmitting part in the direction of movement of the carriage, the stop engaging the clutch member, and means connected to the clutch member for moving the same into the socket and out of engagement with the stop, substantially as and for the purpose described.

49. In a calculating machine, a frame, a laterally shiftable carriage comprising a shaft journaled in the frame and formed with a series of notches and with a peripheral shoulder, a series of elements carried by and movable with the carriage into denominational positions, said elements being movable by the shaft when they are in denominational positions, means for actuating the shaft comprising a member movable about an axis and having a cam, a lever pivoted intermediate of its ends to the frame, one arm thereof coacting with the cam and the other arm having an extension arranged in the path of said shoulder, a clutch member carried by said other arm of the lever and movable into the notch, a stop fixed for movement with the carriage for limiting the movement of the lever on its pivot, said stop engaging the clutch member, and a key for moving the clutch member into one of the notches and out of the path of said stop, and the clutch member being movable out of the notch by the periphery of the shaft during the rotation thereof, substantially as and for the purpose specified.

50. In a calculating machine, a shiftable carriage, a series of elements carried by and movable with the carriage into denominational positions and being movable in a direction crosswise of the carriage into numerical positions, the elements in numerical positions being movable in a retrograde direction, means for actuating said elements in a retrograde direction, a device common to all of said elements and normally holding the same from movement into numerical positions, said elements being movable beyond the end of the device when being shifted by the carriage to the left into denominational positions, and the holding device being movable out of position to engage said elements during the movement thereof in a retrograde direction, and decimal mechanism for moving the carriage a predetermined distance to the right preliminary to the actuation of said elements, substantially as and for the purpose set forth.

51. In a calculating machine, a shiftable carriage, a series of elements carried by and movable with the carriage into denominational positions, said elements being movable in a direction crosswise of the carriage into numerical positions, and each element having a shoulder, the elements in numerical positions being movable in a retrograde direction, means for actuating said elements in a retrograde direction, a device common to all of said elements for engaging the shoulders thereof and normally holding said elements from movement into numerical positions, the shoulders being movable off the end of the device during the movement of the carriage to the left, and the holding device yielding out of position to engage the shoulders during the actuation of said elements, and decimal mechanism for moving the carriage a predetermined distance to the right preliminary to the actuation of said elements and thereby carrying some of said elements into a position in which the shoulders thereof will engage said holding device, substantially as and for the purpose described.

52. In a calculating machine, a shiftable carriage, a series of elements carried by and movable with the carriage into denominational positions, said elements being movable in the direction crosswise of the carriage into numerical positions and each having a shoulder, the elements in numerical positions being movable in a retrograde direction, means for actuating said elements in a retrograde direction, a device common to all of said elements for engaging the shoulders thereof and normally holding said elements from movement into numerical positions, the shoulders being movable off the end of the holding device during the movement of the carriage to the right, and the holding device yielding out of the path of said shoulders during the retrograde movement of the elements, and decimal mechanism for moving the carriage a predetermined distance to the right preliminary to the actuation of said elements in a retrograde direction and thereby carrying two of said elements into a position in which the shoulders thereof will engage and force the holding device out of its normal position, substantially as and for the purpose specified.

53. In a calculating machine, a shiftable carriage, a series of elements carried by and movable with the carriage into denominational positions, said elements being movable in a direction crosswise of the carriage into numerical positions, and each element having a shoulder, and the elements in numerical positions being movable in a retrograde direction, means for actuating said elements in a retrograde direction, means for normally engaging the shoulders and holding said elements from movement into numerical positions, said means comprising a rock arm, a spring for resisting the movement of the rock arm, and a device carried at the end of the rock arm for normally holding the shoulders of said elements, and the shoulders being movable off the end of the device during the movement of the carriage to the right, and decimal mechanism for moving the carriage a predetermined distance to the right preliminary to the actuation of said elements and thereby carrying two of the shoulders into position to engage the holding device and force the same against the action of said spring out of the path of the shoulders, substantially as and for the purpose set forth.

In testimony whereof, I have hereunto signed my name in the presence of two attesting witnesses, at Syracuse, in the county of Onondaga, in the State of New York, this 24th day of Sept., 1910.

WILLIAM H. BROWN.

Witnesses:
  S. DAVIS,
  L. DAVIS.